(12) United States Patent
Windsor (10) Patent No.: US 12,325,602 B2
(45) Date of Patent: Jun. 10, 2025

(54) TRUCK RAMP

(71) Applicant: Chad Windsor, Tiffin, OH (US)

(72) Inventor: Chad Windsor, Tiffin, OH (US)

( * ) Notice: Subject to any disclaimer, the term of this patent is extended or adjusted under 35 U.S.C. 154(b) by 904 days.

(21) Appl. No.: 17/505,978

(22) Filed: Oct. 20, 2021

(65) Prior Publication Data

US 2022/0119211 A1 Apr. 21, 2022

Related U.S. Application Data

(60) Provisional application No. 63/093,890, filed on Oct. 20, 2020.

(51) Int. Cl.
*B65G 69/30* (2006.01)
*B60P 3/06* (2006.01)

(52) U.S. Cl.
CPC ............... *B65G 69/30* (2013.01); *B60P 3/06* (2013.01)

(58) Field of Classification Search
CPC .................................. B65G 69/30; B60P 3/06
USPC .................................................. 14/69.5–72.5
See application file for complete search history.

(56) References Cited

U.S. PATENT DOCUMENTS

| | | | |
|---|---|---|---|
| 3,642,156 A | 2/1972 | Stenson | |
| 4,478,549 A | 10/1984 | Stelly et al. | |
| 4,628,561 A * | 12/1986 | Kushniryk | B65G 69/287 14/71.1 |
| 4,990,049 A | 2/1991 | Hargrove | |
| 5,277,436 A * | 1/1994 | Frank | B65G 69/30 188/30 |
| 5,857,825 A | 1/1999 | Rice | |
| 6,431,815 B1 * | 8/2002 | Zarzecki | B60P 1/431 414/552 |
| 7,810,196 B1 * | 10/2010 | Pritchard | B65G 69/30 414/537 |
| 8,122,551 B2 | 2/2012 | Istre | |
| 10,406,963 B1 * | 9/2019 | Myron | B60P 3/073 |
| 10,532,689 B2 | 1/2020 | Bonham, III | |
| 2006/0133915 A1 | 6/2006 | Day | |
| 2006/0225229 A1 * | 10/2006 | Zhang | E01D 1/00 14/69.5 |
| 2009/0108614 A1 * | 4/2009 | Washington | B60P 1/435 296/61 |

(Continued)

OTHER PUBLICATIONS

Load Trail Single Axle Trailer with Front Ramp Gate and Rear Fold Gate https://www.youtube.com/watch?v=6yqTxGtidQM&app=desktop.

*Primary Examiner* — Raymond W Addie
(74) *Attorney, Agent, or Firm* — Jacob M. Ward; Ward Law Office LLC (57) ABSTRACT

A ramp system for transporting a vehicle between a trailer and a truck includes a first ramp having a first end extending into the trailer and a second end configured to be detachably secured to a horizontal rail of the trailer, a second ramp that can be pivotally secured to the first ramp, and a hinge assembly including a first ramp knuckle disposed on the first ramp, a second ramp knuckle disposed on the second ramp, and a hinge pin configured to be disposed through a first ramp bore and a second ramp bore to pivotally secure the second ramp to the first ramp. The second ramp can pivot via the hinge assembly between an open and a stowed position. The ramp system can include an inner ramp configured to slidingly engage with the second ramp between a retracted position and an extended position.

15 Claims, 10 Drawing Sheets

(56) References Cited

U.S. PATENT DOCUMENTS

| | | | | |
|---|---|---|---|---|
| 2009/0123259 A1* | 5/2009 | Barclay | .................... | B60P 1/43 |
| | | | | 14/71.1 |
| 2011/0072596 A1* | 3/2011 | Kenny | ................... | B60P 1/435 |
| | | | | 296/61 |
| 2011/0277253 A1* | 11/2011 | Billow | ................... | B65G 69/30 |
| | | | | 14/71.1 |
| 2016/0144759 A1* | 5/2016 | DiBlasio | ................ | B60P 1/435 |
| | | | | 414/537 |
| 2017/0022017 A1* | 1/2017 | Lopez | ................... | B65G 69/30 |

* cited by examiner

TRUCK RAMP

CROSS-REFERENCE TO RELATED APPLICATIONS

This application claims priority to and the benefit of U.S. Provisional Application No. 63/093,890, filed on Oct. 20, 2020. The entire disclosure of the above application is hereby incorporated herein by reference.

FIELD

The present disclosure relates generally to loading ramps, and more particularly, to loading ramps for pickup trucks.

INTRODUCTION

The statements in this section merely provide background information related to the present disclosure and may not constitute prior art.

Many individuals enjoy recreational all-terrain vehicles (ATV) that are utilized for off road adventures through the countryside. These ATVS are usually loaded into trailers or directly into the bed of a pickup truck for transportation to a desired area of use. The ATV may be driven on a wider variety of terrain than a street vehicle. Although the operation of an ATV can be similar to a motorcycle, the ATV usually includes four wheels and travels at slower speeds as compared to a motorcycle. In certain circumstances, some ATVs can be legal to drive on a street or road; however, most of the time ATVs are driven in the open countryside area and are transported to off road locations.

Trailers can be used to transport the four-wheel ATV, where the trailer can be hitched to a pickup truck. On occasion where more than one ATV is being transported, an ATV may be loaded into the bed of the truck and another one in the trailer that is hitched to the truck. In order to transport ATVs in this manner, the trailer can be unhitched in order to load one ATV into the bed area of a truck, followed by hitching the trailer back to the truck and loading one or more additional ATVs onto the trailer. Current options for ATV users include use of a foldable ramp for on/offloading of all-terrain recreational vehicles from the rear of trucks, trailers, and vans. The foldable ramps may be folded and stored under the wheelbase of the ATV when not being used.

An alternative option for ATV users includes a ramp assembly that provides for the loading and unloading of small off-road vehicles in and out of the bed of a pickup truck. The ramp assembly may include a flexible support such as a sheet of light weight chain link that is connected to the upper end of the corner post of a truck bed during the loading of the vehicle into the truck. As described above, a variety of ramps are provided for loading vehicles directly onto the bed of a truck, however, little exists to assist in the direct loading of an ATV from an ATV trailer to the bed of a pickup truck.

Accordingly, there is a need for a ramp apparatus that allows a user to directly load an ATV into a bed of a pickup truck without requiring the user to disconnect a trailer from the pickup truck. Desirably, the ramp apparatus will accommodate different lengths and configurations of tongues of trailers to reach the tailgate of the pickup truck from the trailer.

SUMMARY

In concordance with the instant disclosure, a truck ramp system that allows a user to directly load an ATV from a trailer into a bed of a pickup truck without requiring the user to disconnect the trailer from the pickup truck, which also accommodates different lengths and configurations of tongues of trailers to reach the tailgate of the pickup truck, has been surprisingly discovered.

A truck ramp system is provided with a first ramp having a first end and a second end, the first end configured to extend into the trailer and the second end configured to be detachably secured to a horizontal rail of the trailer, and a second ramp having a first end and a second end, the first end of the second ramp is configured to be pivotally secured to the second end of the first ramp. A hinge assembly is provided that includes a first ramp knuckle disposed on the first ramp and defining a first ramp bore, a second ramp knuckle disposed on the second ramp and defining a second ramp bore, and a hinge pin configured to be disposed through the first ramp bore and the second ramp bore to pivotally secure the second ramp to the first ramp. An inner ramp configured to slidingly engage with the second ramp can slide between a retracted position and an extended position relative to the second ramp. The second ramp is configured to pivot via the hinge assembly between an open position and a stowed position.

In one example, the truck ramp system may include a first side and a second side, each one of the first side and the second side form tracks for receiving the inner ramp. In another example, the truck ramp system may include a handle disposed on the second ramp.

In another example, the truck ramp system can include locking features configured to lock the inner ramp in the retracted position or the extended position. In further examples, the locking features can include a locking hole disposed on a sidewall of the second ramp and a locking hole disposed on a sidewall of the inner ramp proximate the second end, wherein when the inner ramp is in the retracted position, the locking hole of the second ramp and the locking hole of the inner ramp align with one another and are configured to receive a locking mechanism to lock the inner ramp in the retracted position. In another aspect, the locking features can include a locking hole disposed on a sidewall of the second ramp and a locking hole disposed on a sidewall of the inner ramp proximate the first end, wherein when the inner ramp is in the extended position, the locking hole of the second ramp and the locking hole of the inner ramp align with one another and are configured to receive a locking mechanism to lock the inner ramp in the extended position.

In further various examples, the inner ramp can include a second end and a ledge extending along the second end, the ledge is configured to engage with an inner wall of a bed of the truck. The inner ramp can include a second end and at least two ledges at the second end, wherein the at least two ledges include a space therebetween and configured to engage with an inner wall of a bed of the truck. The inner ramp can extend from the second ramp thereby extending a length of the second ramp from 20 inches to 35 inches. The first ramp can include an inner wall and a ramp body having a ramp surface extending from the inner wall at an angle, wherein the able between the inner wall and the ramp surface is 60°.

In another embodiment, a truck ramp system for transporting a vehicle between a trailer and a truck includes a first ramp having a first end configured to rest on a floor of the trailer and a second end configured to be detachably secured to a horizontal rail of the trailer, a second ramp having a first end configured to be detachably secured to the second end of the first ramp, a second end, a first side, and a second side, where each one of the first side and the second side defines a U-shape track. The ramp system further includes an inner ramp having a first end, a second end, a first side, and a second side, each one of the first side and the second side defines a U-shape corresponding to the U-shape track of the first side and the second side of the second ramp such that the first end of the inner ramp is received within the second end of the second ramp and slidingly engages with second ramp between a retracted position and an extended position relative to the second ramp.

In one example, the first ramp can include a plate extending outwardly from a top wall and the second ramp defines a slot disposed proximate the first end, wherein the slot is configured to receive the plate of the first ramp to secure the second ramp to the first ramp.

In one example, the truck ramp system includes a hinge assembly including a first ramp knuckle disposed on the first ramp and defining a first ramp bore, a second ramp knuckle disposed on the second ramp and defining a second ramp bore, and a hinge pin configured to be disposed through the first ramp bore and the second ramp boreto pivotally secure the second ramp to the first ramp.

In one example, the truck ramp system includes a locking mechanism configured to lock the inner ramp in the retracted position or the extended position.

In various other examples, the first ramp includes a first ramp surface, the second ramp includes a second ramp surface, and the inner ramp includes an inner ramp surface configured to form a path surface for transferring the vehicle between the trailer and truck. Each one of the first ramp surface, the second ramp surface, and the inner ramp surface can include metal grating. The truck ramp system can include a handle disposed on the second ramp. The inner ramp can include a ledge at the second end configured to engage with a bed of the truck Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Figure 1:
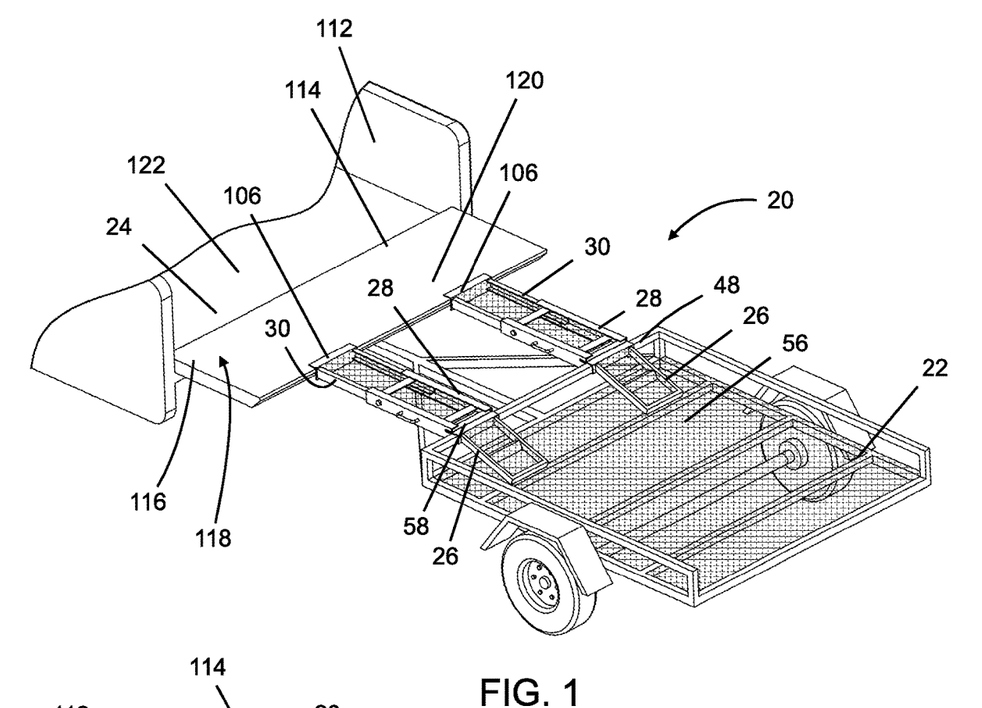
FIG. 1 is a perspective view of a trunk ramp apparatus for loading and unloading an ATV between a trailer and a truck according to the present disclosure.
Figure 2:
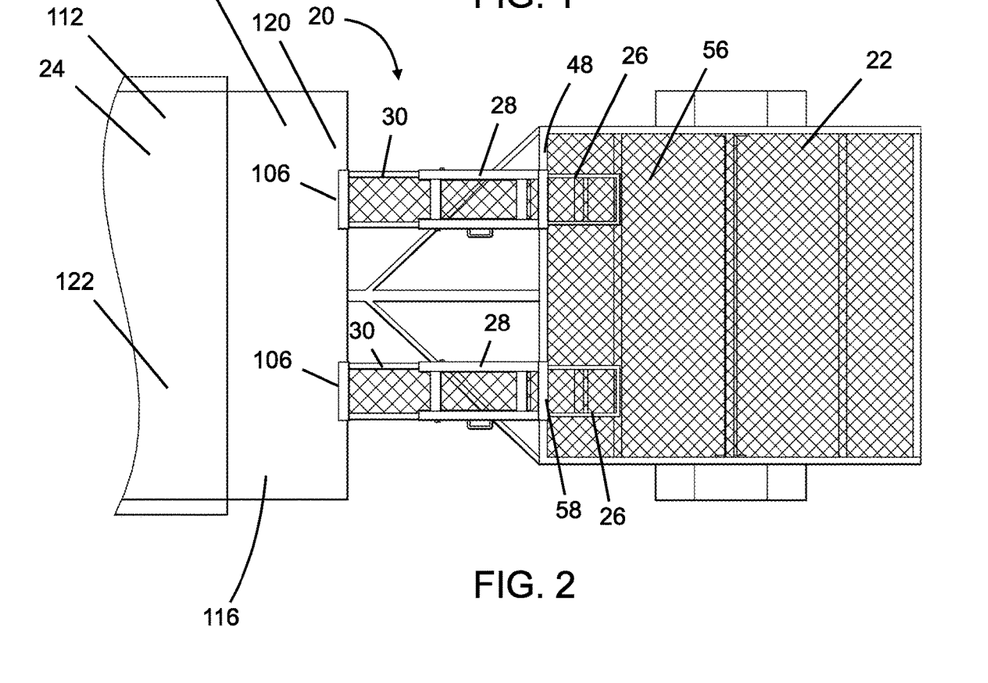
FIG. 2 is a top plan view of the trunk ramp apparatus of FIG. 1.
Figures 3, 4, 5:
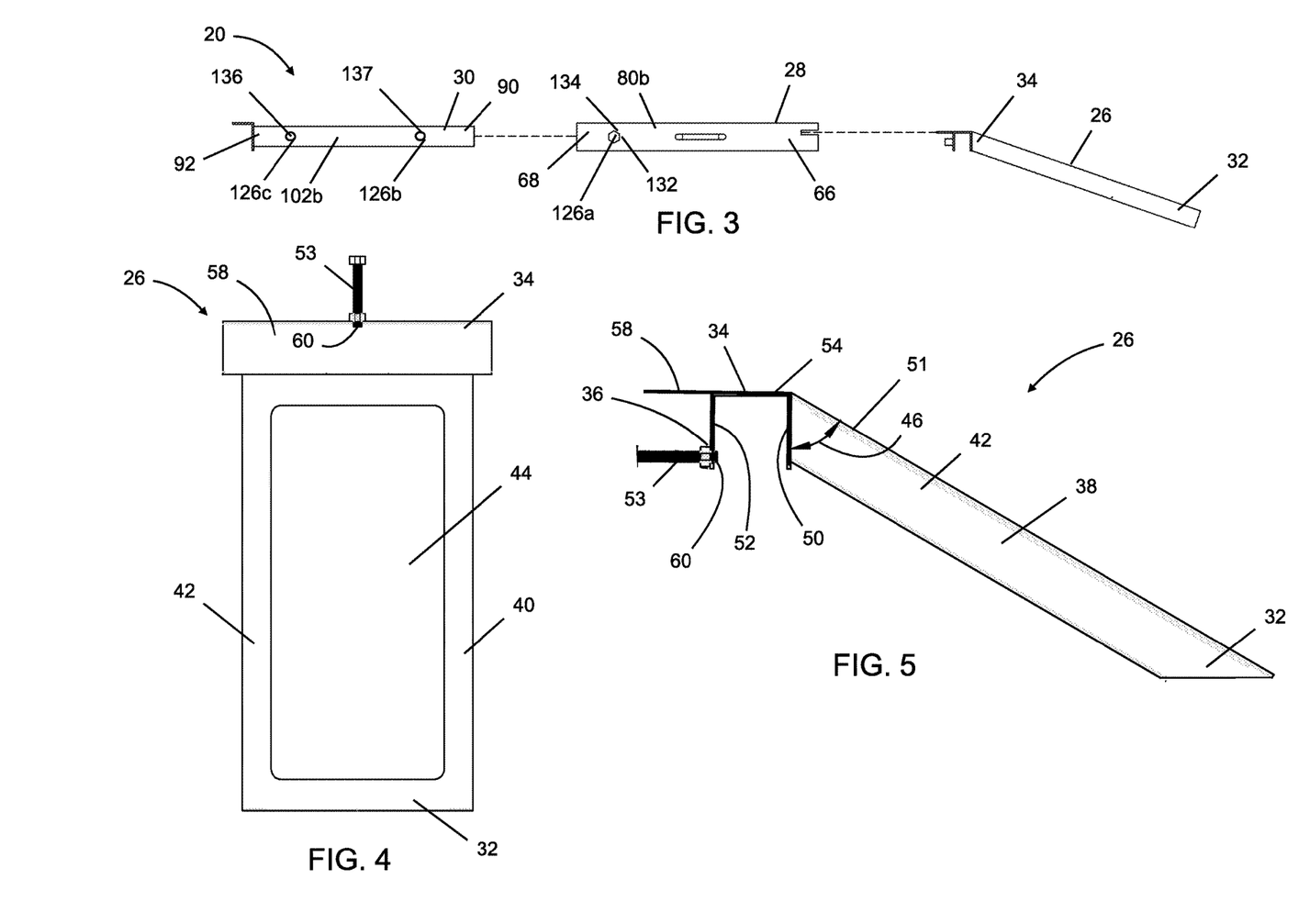
FIG. 3 is an exploded side view of the truck ramp apparatus of FIG. 1.
FIG. 4 is top plan view of a first ramp according to the present disclosure.
FIG. 5 is a side elevation view of the first ramp of FIG. 4.
Figure 6:
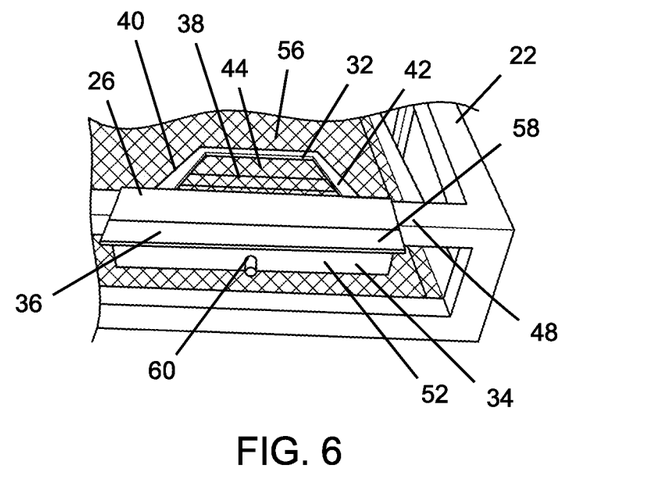
FIG. 6 is a top perspective view of the first ramp illustrating a first end resting on a trailer and a second end attached to a front end of the trailer.
Figure 7:
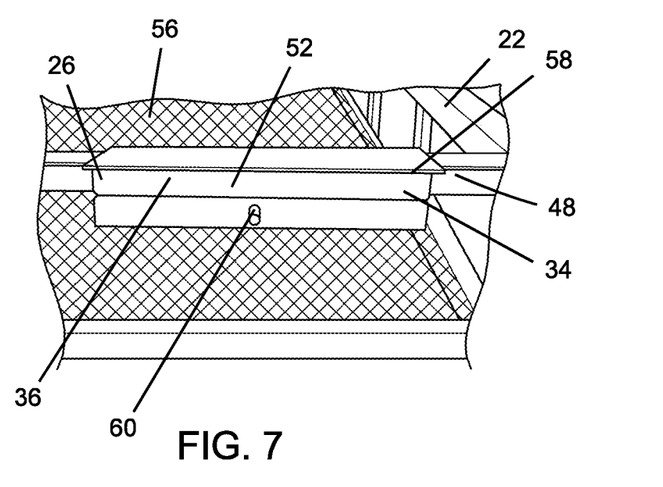
FIG. 7 is a rear view of the first ramp illustrating a second end thereof attached to a front end of a trailer.

Referring to FIGS. 1-3, a ramp system 20 for transporting equipment, for example, loading and unloading all-terrain vehicles (ATV), between a trailer 22 and a truck 24 is shown. The ramp system 20 includes a first ramp 26, a second ramp 28, and an inner ramp 30. The first ramp 26 is attached to the trailer 22, the second ramp 28 is detachably secured to the first ramp 26, and the inner ramp 30 is disposed within the second ramp 28. The inner ramp 30 engages with and rests on the truck 24 thus establishing a continuous ramp between the trailer 22 and truck 24. The inner ramp 30 can be in sliding engagement with the second ramp 28 thereby permitting telescoping extension and retraction of the inner ramp 30 relative to the second ramp 28 to accommodate varying distances between the trailer 22 and the truck 24.

Referring to FIGS. 4-7, the first ramp 26 includes a first end 32, a second end 34, an attachment assembly 36, and a ramp body 38 having a first side 40 and a second side 42 opposite the first side 40, and a first ramp surface 44. The attachment assembly 36 is disposed at the second end 34 and is configured to detachably secure the first ramp 26 to the trailer 22 and to the second ramp 28. In one example, the attachment assembly 36 defines a C-channel (best shown in FIG. 5) configured to engage a horizontal rail 48 of the trailer 22 for attaching the first ramp 26 to the trailer 22. More specifically, the attachment assembly 36 is defined by an inner wall 50, an outer wall 52, and a top wall 54, and is configured to receive the horizontal rail 48 of the trailer 22. Once the second end 34 of the first ramp 26 is attached to the horizontal rail 48, the outer wall 52 can be secured to the horizontal rail 48 via a bolt 53. The outer wall 52 can define an opening 60 through which the bolt 53 can extend thereby securing the first ramp 26 to the horizontal rail 48. The ramp body 38 extends at an angle from the inner wall 50 of the attachment assembly 36 toward the trailer floor 56. In one example, the angle between a top surface 51 of the ramp body 38 and the inner wall 50 of the attachment assembly 36 is 60°, as shown at 46 in FIG. 5. As such, when the first ramp 26 is attached to the trailer 22, the second end 34 is secured to the horizontal rail 48 via the attachment assembly 36 and the first end 32 rests on the trailer floor 56.

In one embodiment, as shown in FIGS. 4-7, the attachment assembly 36 can include a plate 58 extending outwardly from the top wall 54 of the attachment assembly 36 along substantially the same plane. The plate 58 is configured to mate with slots 62 of the second ramp 28 to secure the second ramp 28 to the first ramp 26, which is described in greater detail below.

Figure 8:
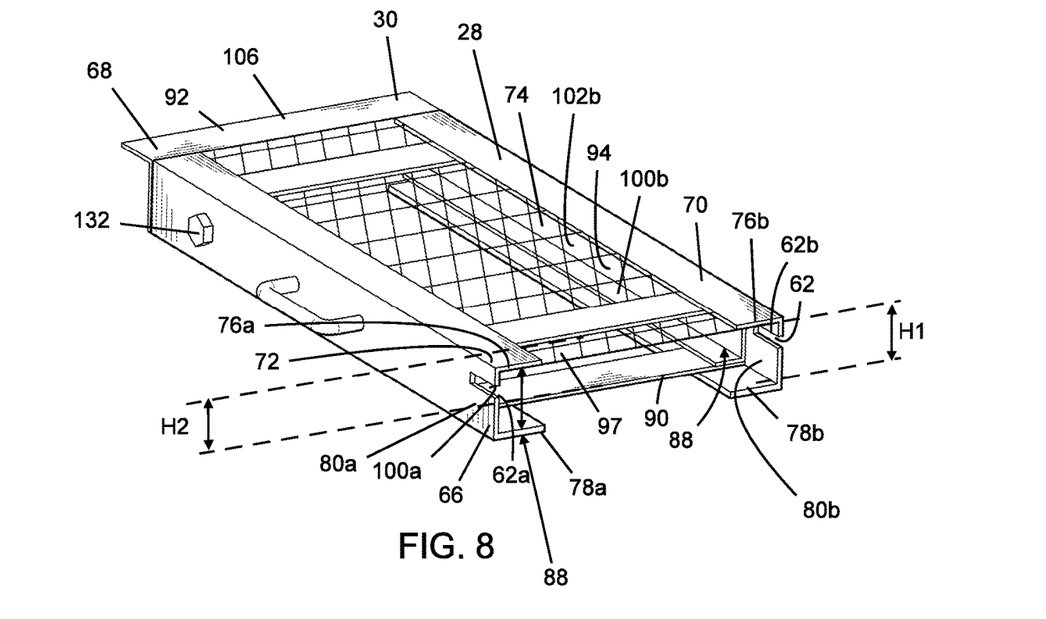
FIG. 8 is a top perspective view of a second ramp in a retracted position according to the present disclosure.
Figure 9:
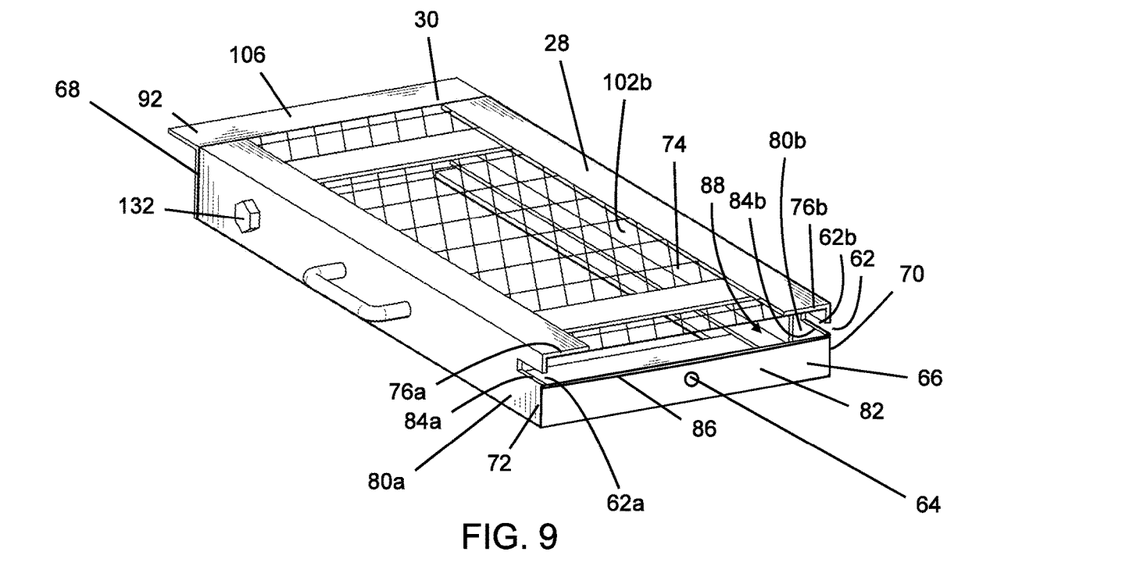
FIG. 9 is a top perspective view of the second ramp of FIG. 8, further depicting an attachment plate according to the present disclosure

Referring to FIGS. 8-9, the second ramp 28 is shown having the inner ramp 30 disposed therein, wherein the inner ramp 30 is in the retracted position 128 and a ledge 106 of the inner ramp 30, protruding from the second ramp 28 is visible. The second ramp 28 includes a first end 66, a second end 68, a first side 70, a second side 72 opposite the first side 70, and a second ramp surface 74. The first end 66 of the second ramp 28 can be configured to be detachably secured to the second end 34 of the first ramp 26. The second end 68 of the second ramp 28 extends away from the trailer 22 and toward the truck 24.

As best shown in FIG. 8, each one of the first side 70 and the second side 72 includes an upper wall 76a, 76b, a lower wall 78a, 78b, and a side wall 80a, 80b extending from the upper wall 76a, 76b to the lower wall 78a, 78b. The upper wall 76a, 76b, lower wall 78a, 78b, and side wall 80a, 80b of the first side 70 and the second side 72 create tracks 88, to permit sliding of the inner ramp 30 within the second ramp 28, which is described in greater detail below. Each sidewall 80a, 80b defines a slot 62a, 62b at the first end 66 of the second ramp 28, wherein the slots 62a, 62b are configured to receive the plate 58 of the first ramp 26 to facilitate securing the second ramp 28 to the first ramp 26.

As best shown in FIG. 9, the second ramp 28 can include an attachment plate 82 disposed at the first end 66 and extending between the first and second sides 70, 72. In one example, the attachment plate 82 extends from the lower walls 78a, 78b to a bottom surface 84a, 84b of the slots 62a, 62b such that a top surface 86 of the attachment plate 82 is flush with the bottom surfaces 84a, 84b of the slots 62a, 62b thereby facilitating securing the plate 58 of the first ramp 26 within the slots 62a, 62b of the second ramp 28.

The attachment plate 82 can further define an attachment hole 64 corresponding to the opening 60 of the attachment assembly 36 of the first ramp 26 and configured to receive the bolt 53 to further facilitate securing the second ramp 28 to the first ramp 26. When the plate 58 of the first ramp 26 is inserted into the slots 62a, 62b of the second ramp 28, the attachment plate 82 of the second ramp 28 is in mating contact with the outer wall 52 of the first ramp 26 such that the attachment hole 64 of the second ramp 28 aligns with the opening 60 of the first ramp 26. When aligned, the bolt 53 is screwed through the attachment hole 64 and opening 60 of the second ramp 28 and first ramp 26, respectively, thereby securing the first end 66 of the second ramp 28 to the second end 34 of the first ramp 26. It should be appreciated that one skilled artisan may select other methods of securing the first end 66 of the second ramp 28 to the second end 34 of the first ramp 26, as desired, while remaining within the scope of the present disclosure.

Figure 10:
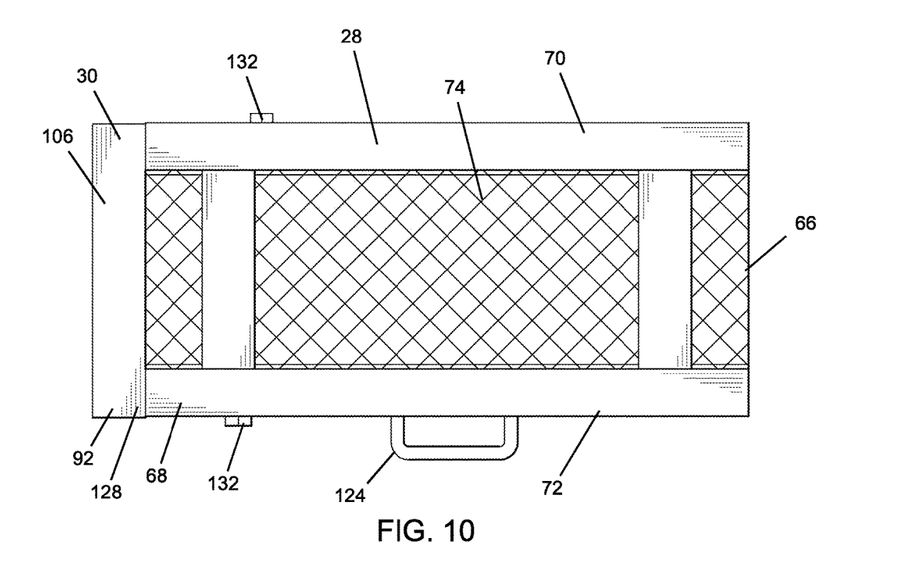
FIG. 10 is a top plan view of a second ramp of FIG. 8 in the retracted position according to the present disclosure.
Figure 11:
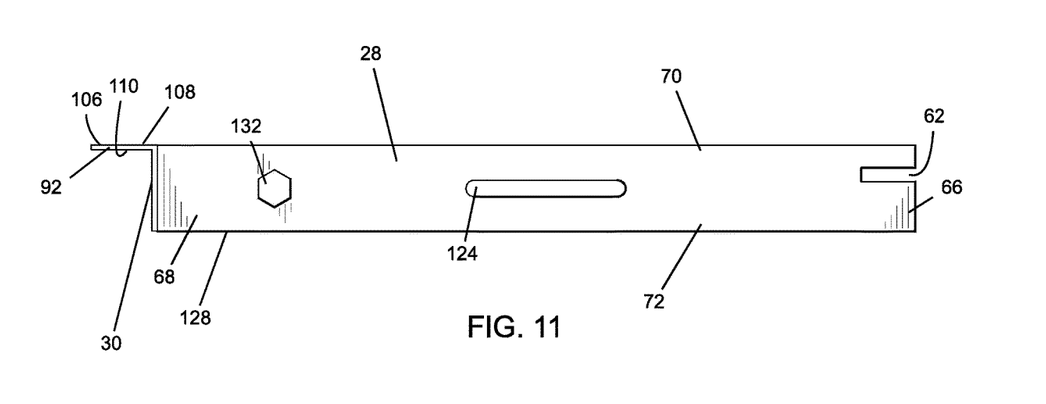
FIG. 11 is a side elevation view of the second ramp of FIG. 8 in the retracted position.
Figure 12:
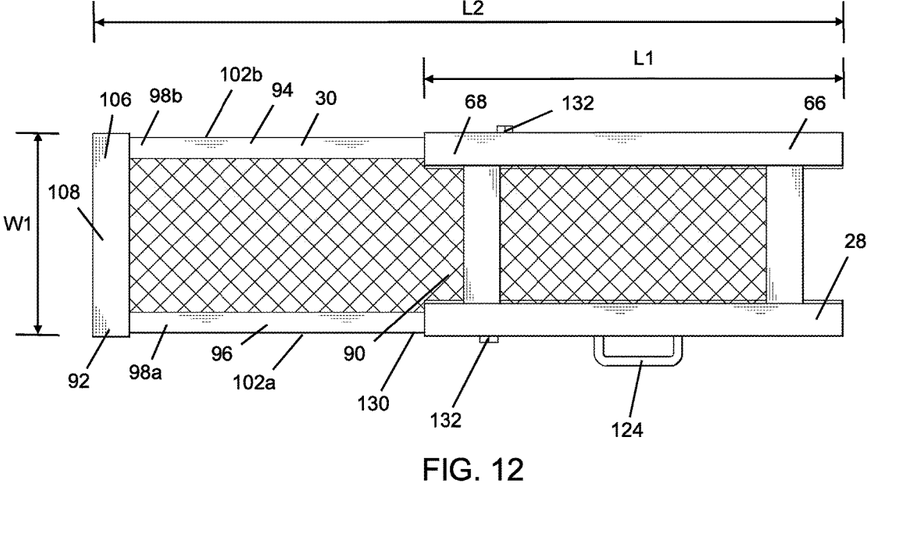
FIG. 12 is a top plan view of the second ramp of FIG. 8 in an extended position.
Figure 13:
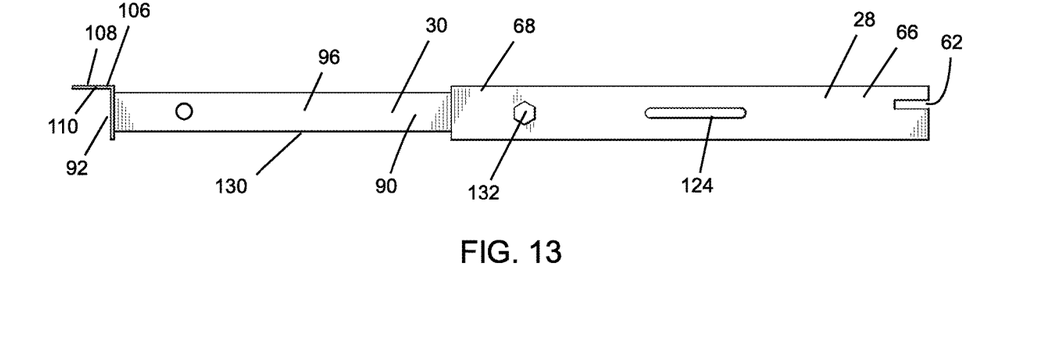
FIG. 13 is a side elevation view of the second ramp of FIG. 8 in the extended position.
Figure 14:
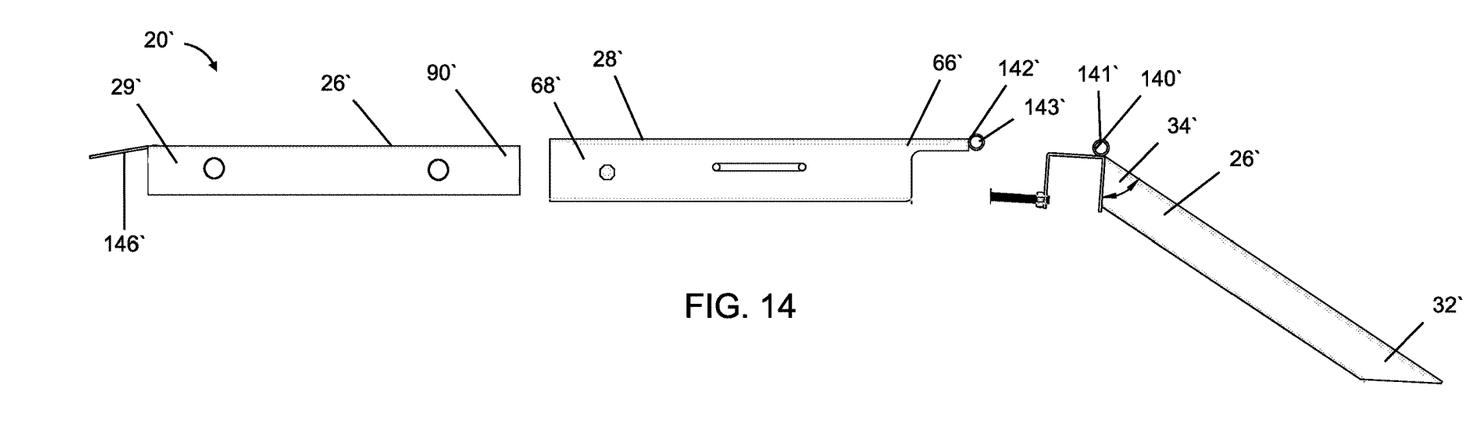
FIG. 14 is an exploded view of a truck ramp apparatus according to another embodiment of the present disclosure.
Figure 15:
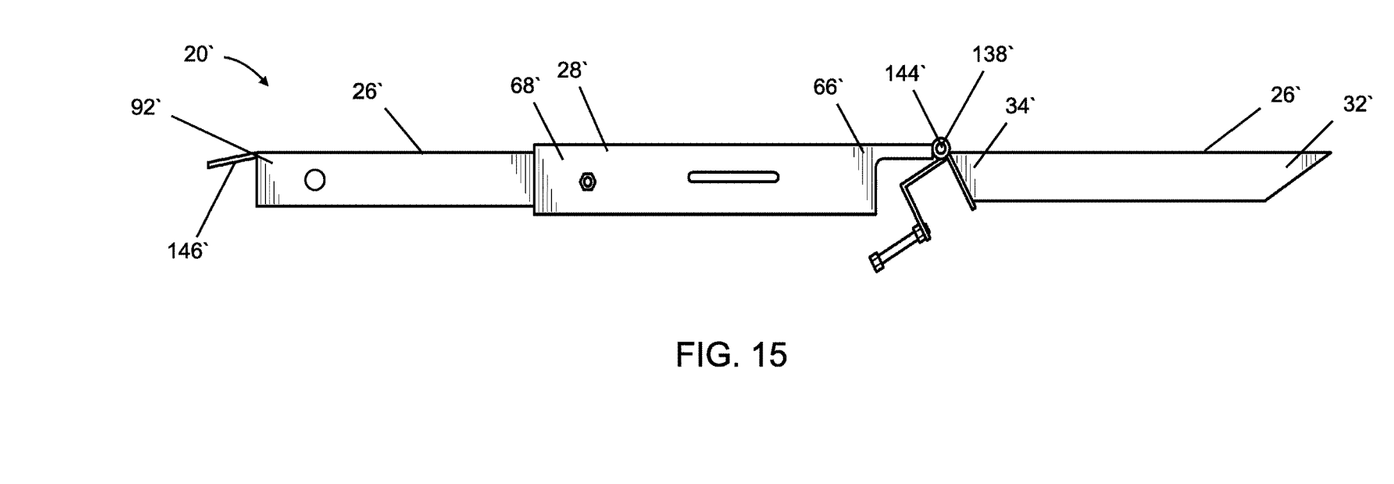
FIG. 15 is a side elevation view of the truck ramp apparatus of FIG. 14 depicting a first ramp attached to a second ramp and an inner ramp extending from the second ramp.
Figure 16:
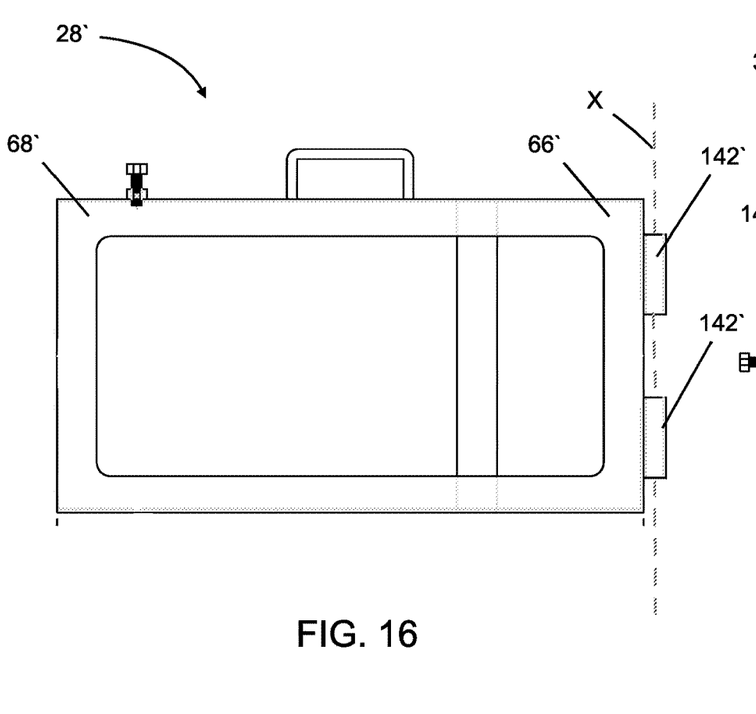
FIG. 16 is a top plan view of the second ramp of FIG. 14.
Figure 17:
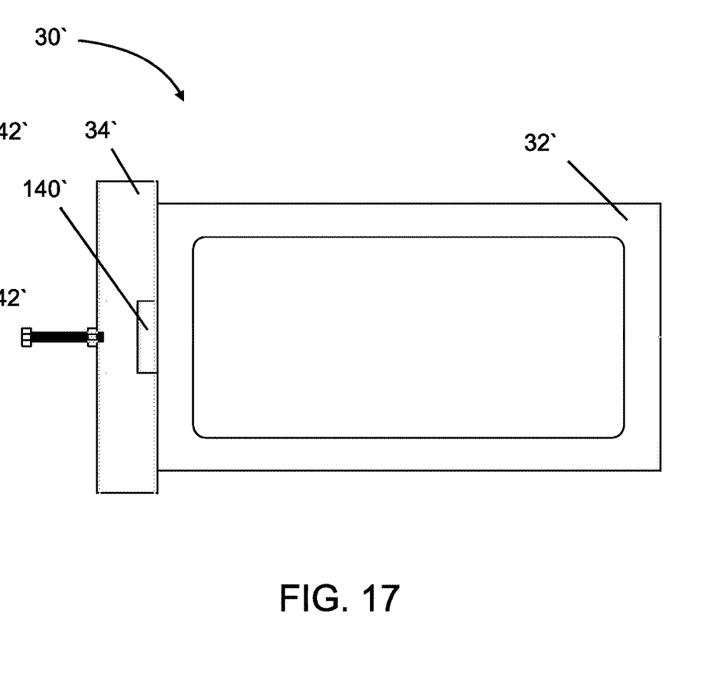
FIG. 17 is a top plan view of the first ramp of FIG. 14.

Referring to FIGS. 12-13, the inner ramp 30 is configured to be detachably coupled to and slidingly engaged with the second ramp 28 to permit the inner ramp 30 to extend or telescope from the second end 68 of the second ramp 28 thereby providing the ramp system 20 with a variable length to accommodate for different lengths and configurations of tongues of trailer 22. As such, the telescoping inner ramp 30 is slidable between a retracted position 128 (FIGS. 10-11) and an extended position 130 (FIGS. 12-13) relative to the second ramp 28 thereby permitting adjustment of the ramp system 20 to a predetermined length in order to form a path to bridge a gap between the trailer 22 and truck 24, as shown in FIG. 1.

With reference to FIG. 12, in a non-limiting example, the inner ramp 30 may extend from the second ramp 28 thereby extending the second ramp 28 from 20 inches L1 to 35 inches L2 in length.

In one example, the inner ramp 30 can include a first end 90, a second end 92, a first side 94, a second side 96 opposite the first side 94, and an inner ramp surface 97. With additional reference to FIG. 8, each one of the first side 94 and the second side 96 can include an upper wall 98a, 98b, a lower wall 100a, 100b, and a side wall 102a, 102b extending from the upper wall 98a, 98b to the lower wall 100a, 100b. The upper wall 98a, 98b, lower wall 100a, 100b, and side wall 102a, 102b of the first side 94 and the second side 96 defines a shape correlating with a shape of the tracks 88 defined by the first and second sides 70, 72 of the second ramp 28 to permit sliding of the inner ramp 30 within the second ramp 28.

In the example shown in FIG. 8, the tracks 88 of the first and second sides 70, 72 of the second ramp 28 define a U-shape and the first and second sides 94, 96 of the inner ramp 30 define a U-shape to correlate with the U-shape tracks 88 of the second ramp 28 to permit sliding engagement. Furthermore, the upper wall 76a, 76b and the lower wall 78a, 78b of the second ramp 28 defines a height H1 of the U-shape tracks 88. Likewise, the upper wall 98a, 98b, and the lower wall 100a, 100b of the inner ramp 30 defines a height H2, which is less than the height H1 of the U-shape tracks 88 of the second ramp 28, therefore, facilitating sliding engagement of the inner ramp 30 within the second ramp 28.

In one form, the first end 90 of the inner ramp 30 can be received within the second end 68 of the second ramp 28 and translated between the extended position 130 and retracted position 128.

With reference to FIGS. 1-2 and 12-13, the inner ramp 30 can include a ledge 106 extending along the second end 92. The ledge 106 includes a top surface 108 and a bottom surface 110 configured to abut the inner wall 120 of the tailgate 114 of the truck 24 thereby establishing the ramp between the trailer 22 and truck 24. The engagement between the inner wall 120 of the tailgate 114 and bottom surface 110 of the inner ramp 30 provides support to hold the inner ramp 30 stably in place.

More specifically, the truck 24 includes a bed 112 and a tailgate 114 adapted to pivot about a horizontal pivot axis between a closed position (not shown) and an open position 116. To move the tailgate 114 from the closed position to the open position 116, the tailgate 114 pivots downwards approximately 90° opening the rear-end 118 of the truck 24. When the tailgate 114 is in the open position 116, the inner wall 120 of the tailgate 114 is on approximately the same plane as the floor 122 of the bed 112 thereby granting access to the bed 112 from the rear-end 118. The engagement between the inner wall 120 of the tailgate 114 and bottom surface 110 of the inner ramp 30 provides support to hold the inner ramp 30 stably in place.

Referring to FIGS. 3 and 10-13, the ramp system 20 can include locking features 126a, 126b, 126c configured to lock the inner ramp 30 in the retracted position 128 (FIGS. 10-11) or extended position 130 (FIGS. 12-13). For example, the inner ramp 30 may be locked in at least one of the extended position 130 and the retracted position 128 through the use of at least one of a fastener 132, a push pin (not shown), and a friction fit design (not shown), as non-limiting examples.

In one specific example, the locking features 126a, 126b, 126c can include a locking hole 134 disposed on a sidewall 80a, 80b of the second ramp 28 and at least two corresponding locking holes 136, 137 (FIG. 3) disposed on a sidewall 102a, 102b of the inner ramp 30. When the ramp system 20 is in the retracted position 128 (FIGS. 10-11), the locking hole 134 of the second ramp 28 and corresponding locking hole 136 disposed toward the second end 92 of the inner ramp 30 align for receiving a locking mechanism 132 thereby locking the ramp system 20 is in the retracted position 128. In one example, the locking mechanism 132 is a fastener. When the ramp system 20 is in the extended position 130 (FIGS. 12-13), the locking hole 134 of the second ramp 28 and corresponding locking hole 137 (FIG. 3) disposed toward the first end 90 of the inner ramp 30 align for receiving the locking mechanism 132 thereby locking the ramp system 20 is in the extended position 130. Advantageously, the locking inner ramp 30 militates against inner ramp 30 from undesirably moving during operation. One skilled in the art may select other ways of locking the inner ramp 30 in at least one of an extended position 130 and a retracted position 132, within the scope of the present disclosure.

Referring to FIGS. 14-21, in another embodiment, the second ramp 28' is pivotally secured to the first ramp 26' via a hinged connection. In FIGS. 14-21, like or related structure to that shown in FIGS. 1-13 is identified with the same reference number and a prime symbol (') for purposes of clarity.

Figure 18:
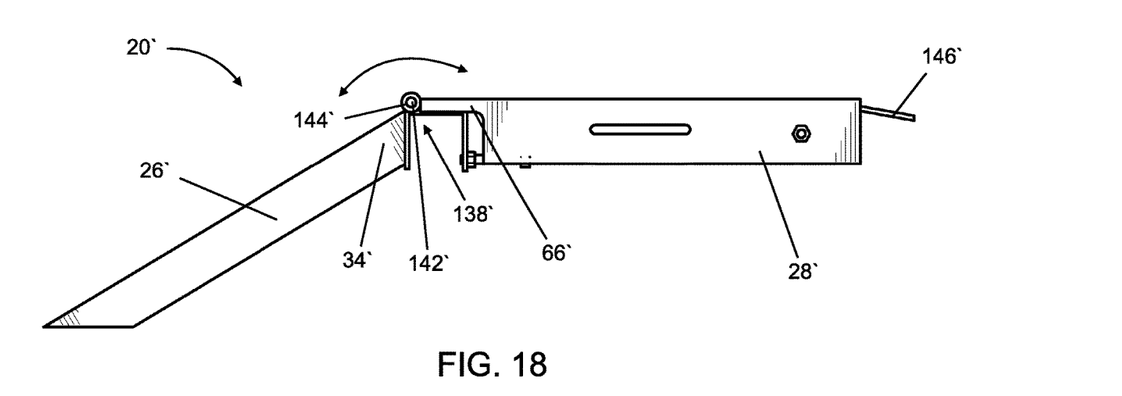
FIG. 18 is a side elevation view of a first ramp and a second ramp in an open position.
Figure 19:
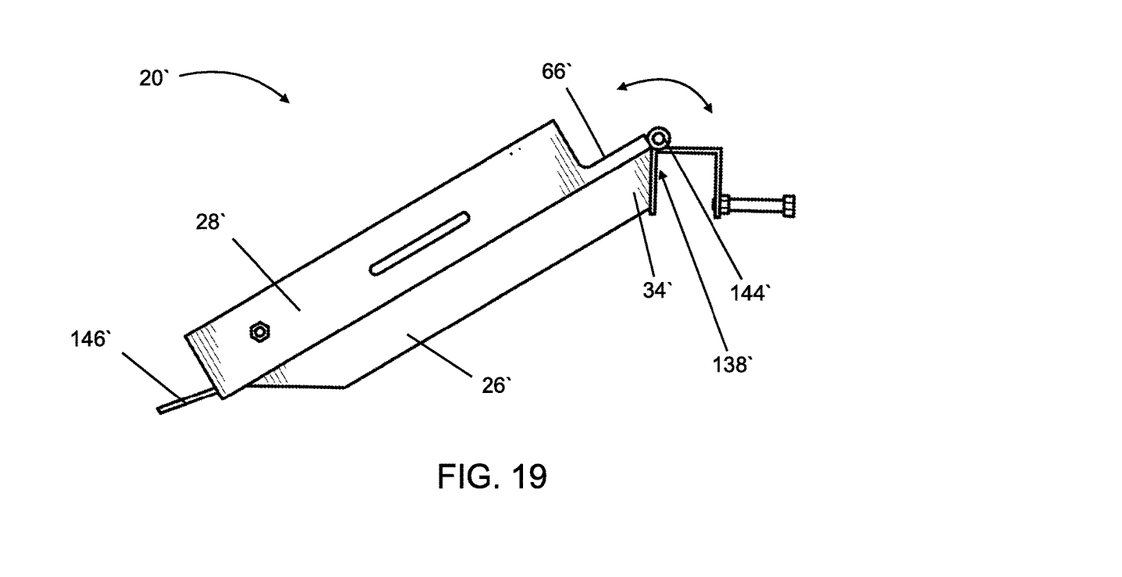
FIG. 19 is a side elevation view of a first ramp and a second ramp in a stowed position.

As shown in FIGS. 14-19, a hinge assembly 138' is provided that is adapted to facilitate pivotal motion of the second ramp 28' relative to the first ramp 26' about a substantially horizontal axis X of rotation (FIG. 16) for vertical-lift rotation, as indicated by the double arrows in FIGS. 18-19. The vertical-lift rotation allows for the second ramp 28' to rotate between an open position and a stowed position.

The hinge assembly 138' includes a first ramp knuckle 140, a second ramp knuckle 142' and a hinge pin 144'. The first ramp knuckle 140 is disposed proximate the second end 34' of the first ramp 26' and has a generally cylindrical shape with a first ramp bore 141' therethrough. The second ramp knuckle 142' is disposed proximate the first end 66' of the second ramp 28' and has a generally cylindrical shape with a second ramp bore 143' therethrough. The hinge pin 144' is adapted to pass through the bore of the first ramp knuckle 140' and the second ramp knuckle 142'.

In one example, as best shown in FIGS. 16-17 and 20-21, the hinge assembly 138 includes the first ramp knuckle 140' and two second ramp knuckles 142 having a space therebetween. The first ramp knuckle 140' is configured to be disposed between the two second ramp knuckles 142' such that the bores of the first ramp knuckle 140' and the second ramp knuckles 142' align for receiving the hinge pin 144' thereby securing the second ramp 28' to the first ramp 26'.

In operation, the pivotal motion allows the second ramp 28' to pivot between the open position (FIG. 18) and the stowed position (FIG. 19). In the open position (FIG. 18), the second ramp 28' extends away from the first ramp 26' and the truck ramp system 20' forms a continuous ramp between the trailer 22 and truck 24 such that the first end 32' of the first ramp 26' rests against the trailer floor and a ledge 146' of the inner ramp 30' rests against the bed of the truck. In the stowed position (FIG. 19), the second ramp 28' is vertically lifted and rotated about the horizontal axis X toward the first ramp 26' until the second ramp 28' rests on the first ramp 26'. In other words, when in the stowed position, the second ramp 28' is folded onto the first ramp 26' such that both the first ramp 26' and the second ramp 28' are disposed in the trailer 22.

Figures 20, 21:
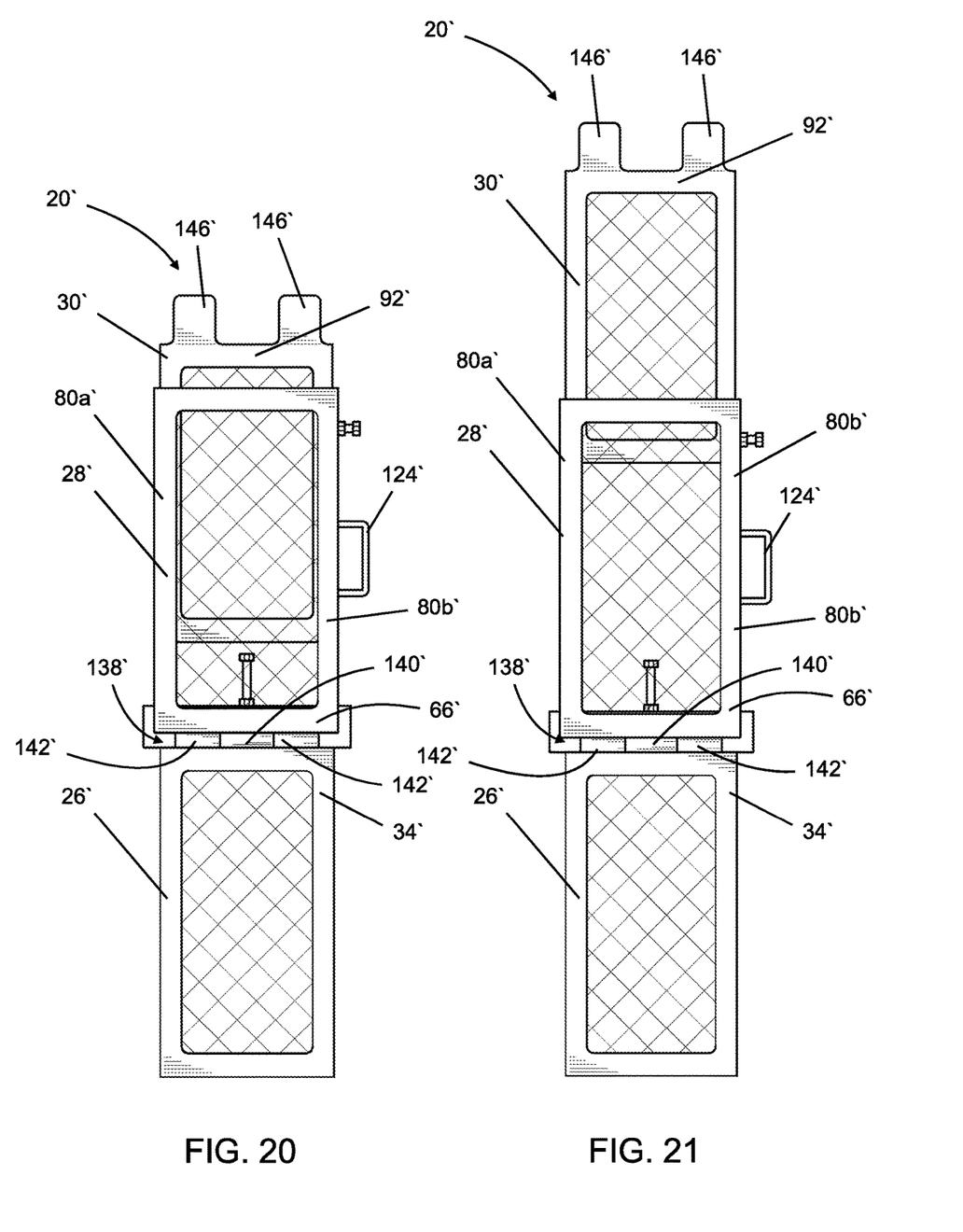
FIG. 20 is a top plan view of truck ramp apparatus of FIG. 14, depicting the inner ramp in a retracted position.
FIG. 21 is a top plan view of truck ramp apparatus of FIG. 14, depicting the inner ramp in an extended position.

As shown in FIGS. 20-21, the second ramp 28' may include a handle 124'. The handle 124' can be disposed on the first or second sidewall 80*a*, 80*b'* of the second ramp 28'. In the example shown in FIGS. 20-21, the handle 124' is disposed on the second sidewall 80*b'* of the second ramp 28'. In another example, the handle 124' can be welded onto the sidewall 80*a*, 80*b'* of the second ramp 28', as a non-limiting example. Advantageously, the handle 124' may allow a user to carry and transport the second ramp 28 more ergonomically. One skilled in the art can select other methods of forming and attaching the handle 124' to the second ramp 28', within the scope of the present disclosure. It should be appreciated that one skilled in the art may scale the number, location, type, and dimensions of the handle 124', for example, including a handle 124' on each side of the second ramp, as desired.

With continued reference to FIGS. 20-21, the ledge 146', according to another embodiment, is similar to the ledge 106 of FIGS. 1-13 except that instead of extending along the entire length of second end 92' of the inner ramp 30', the ledge 146' can include at least two ledges 146' at the second end 92' having a space therebetween. It should be appreciated that one skilled in the art may scale the location and dimensions of the ledge, as desired.

Referring back to FIGS. 1-2, in another embodiment, the ramp system 20 may include two first ramps 26 attached to the horizontal rail 48 of the trailer 22 and two second ramps 28 engaged with the truck 24 to accommodate, for example, an ATV having four wheels. The distance between the two first ramps 26 attached to the trailer 22 can be predetermined by the distance between the tires on the ATV or the width of the object being loaded, as non-limiting examples.

In another example, the first ramp 26, the second ramp 28, and the inner ramp 30 may define a width of approximately 12 inches W1. It should be appreciated that one skilled in the art may scale the dimensions of the first ramp 26, the second ramp 28, and the inner ramp 30, as desired.

The first ramp surface 44, the second ramp surface 74, and the inner ramp surface 97 are configured to form a path for transferring the ATV to and from the trailer 22 and truck 24. The first ramp surface 44, the second ramp surface 74, and the inner ramp surface 97 can be made of metal grating having openings sufficient to let debris fall through, as a non-limiting example. It should be appreciated that one skilled in the art may employ any surface known in the art, as desired.

Advantageously, the truck ramp system 20, 20' allows a user to directly load an ATV into a bed 112 of a pickup truck 24 without requiring the user to disconnect a trailer 22 from the pickup truck 24 and the truck ramp system 20, 20' also accommodates different lengths and configurations of tongues of trailers 22 to reach the desired loading area of the pickup truck 24.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A truck ramp system for transporting a vehicle between a trailer and a truck, the truck ramp system comprising:
   a first ramp having a first end and a second end, the first end configured to extend into the trailer and the second end configured to be detachably secured to a horizontal rail of the trailer;
   a second ramp having a first end and a second end, the first end of the second ramp configured to be pivotally secured to the second end of the first ramp;
   a hinge assembly including a first ramp knuckle disposed on the first ramp and defining a first ramp bore, a second ramp knuckle disposed on the second ramp and defining a second ramp bore, and a hinge pin configured to be disposed through the first ramp bore and the second ramp bore to pivotally secure the second ramp to the first ramp; and
   an inner ramp configured to slidingly engage with the second ramp between a retracted position and an extended position relative to the second ramp, wherein the second ramp is configured to pivot via the hinge assembly between an open position and a stowed position, the inner ramp can extend from the second ramp thereby extending a length of the second ramp from 20 inches to 35 inches, and further comprising a handle disposed on the second ramp.

2. The truck ramp system of claim 1, wherein the second ramp includes a first side and a second side, each one of the first side and the second side form tracks for receiving the inner ramp.

3. The truck ramp system of claim 1, wherein the inner ramp includes a second end and a ledge extending along the second end, the ledge configured to engage with an inner wall of a bed of the truck.

4. The truck ramp system of claim 1, wherein the inner ramp includes a second end and at least two ledges at the second end, wherein the at least two ledges include a space therebetween and configured to engage with an inner wall of a bed of the truck.

5. The truck ramp system of claim 1 further comprising locking features configured to lock the inner ramp in at least one of the retracted position and the extended position.

6. The truck ramp system of claim 5, wherein the locking features include a locking hole disposed on a sidewall of the second ramp and a locking hole disposed on a sidewall of the inner ramp proximate the second end, wherein when the inner ramp is in the retracted position, the locking hole of the second ramp and the locking hole of the inner ramp align with one another and are configured to receive a locking mechanism to lock the inner ramp in the retracted position.

7. The truck ramp system of claim 5, wherein the locking features include a locking hole disposed on a sidewall of the second ramp and a locking hole disposed on a sidewall of the inner ramp proximate the first end, wherein when the inner ramp is in the extended position, the locking hole of the second ramp and the locking hole of the inner ramp align with one another and are configured to receive a locking mechanism to lock the inner ramp in the extended position.

8. The truck ramp system of claim 1, wherein the first ramp includes an inner wall and a ramp body having a ramp surface extending from the inner wall at an angle, wherein the angle between the inner wall and the ramp surface is 60°.

9. A truck ramp system for transporting a vehicle between a trailer and a truck, the truck ramp system comprising:

a first ramp having a first end configured to rest on a floor of the trailer and a second end configured to be detachably secured to a horizontal rail of the trailer;

a second ramp having a first end configured to be detachably secured to the second end of the first ramp, a second end, a first side, and a second side, each one of the first side and the second side defining a U-shape track; and an inner ramp having a first end, a second end, a first side, and a second side, each one of the first side and the second side of the inner ramp defining a U-shape corresponding to the U-shape track of the first side and the second side of the second ramp such that the first end of the inner ramp is received within the second end of the second ramp and slidingly engages with second ramp between a retracted position and an extended position relative to the second ramp.

10. The truck ramp system of claim 9, wherein the first ramp includes a plate extending outwardly from a top wall and the second ramp defines a slot disposed proximate the first end, wherein the slot is configured to receive the plate of the first ramp to secure the second ramp to the first ramp.

11. The truck ramp system of claim 9 further comprising a hinge assembly including a first ramp knuckle disposed on the first ramp and defining a first ramp bore, a second ramp knuckle disposed on the second ramp and defining a second ramp bore, and a hinge pin configured to be disposed through the first ramp bore and the second ramp bore to pivotally secure the second ramp to the first ramp.

12. The truck ramp system of claim 9 further comprising a locking mechanism configured to lock the inner ramp in the retracted position.

13. The truck ramp system of claim 9 further comprising a locking mechanism configured to lock the inner ramp in the extended position.

14. The truck ramp system of claim 9, wherein the first ramp includes a first ramp surface, the second ramp includes a second ramp surface, and the inner ramp includes an inner ramp surface configured to form a path surface for transferring the vehicle between the trailer and truck.

15. The truck ramp system of claim 14, wherein each one of the first ramp surface, the second ramp surface, and the inner ramp surface include metal grating.

* * * * *